United States Patent
Wang et al.

(10) Patent No.: US 6,910,558 B2
(45) Date of Patent: Jun. 28, 2005

(54) SELF-LOCKING MECHANISM FOR A TELESCOPING COLUMN

(75) Inventors: Jenne-Tai Wang, Troy, MI (US); Gary Lee Jones, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/324,566

(22) Filed: Dec. 19, 2002

(65) Prior Publication Data

US 2004/0118647 A1 Jun. 24, 2004

(51) Int. Cl.⁷ .................................................. F16F 9/32
(52) U.S. Cl. ...................................... 188/300; 267/207
(58) Field of Search ........................ 188/300; 16/63–65; 267/205, 207

(56) References Cited

U.S. PATENT DOCUMENTS

| | | | | |
|---|---|---|---|---|
| 2,845,902 A | * | 8/1958 | Anderson | 188/67 |
| 3,788,148 A | * | 1/1974 | Connell et al. | 74/492 |
| 4,141,117 A | * | 2/1979 | Van Gompel | 24/136 R |
| 4,601,232 A | * | 7/1986 | Troxell, Jr. | 92/24 |
| 4,886,255 A | * | 12/1989 | Paton | 267/205 |
| 5,273,240 A | * | 12/1993 | Sharon | 267/205 |
| 5,967,573 A | | 10/1999 | Wang | |
| 6,076,856 A | * | 6/2000 | Wang et al. | 280/806 |
| 6,302,458 B1 | * | 10/2001 | Wang et al. | 293/132 |
| 6,401,565 B1 | | 6/2002 | Wang et al. | |
| 6,641,166 B2 | * | 11/2003 | Browne et al. | 280/752 |

* cited by examiner

Primary Examiner—Robert A. Siconolfi
(74) Attorney, Agent, or Firm—Kathryn A. Marra

(57) ABSTRACT

A telescoping column includes a first tube and a second tube arranged in telescoping fashion. A locking structure is disposed between a surface formed on the first tube and a ramp disposed on the second tube. The locking structure contacts the ramp at a first elongated area of contact, and the locking structure contacts the surface at a second elongated area of contact. Relative movement of the first and second tubes in response to an impact force applied to one of the first and second tubes causes the locking structure to become wedged between the ramp and the surface, and at least a portion of the impact force between the first and second tubes is transmitted through the first and second elongated areas of contact.

15 Claims, 7 Drawing Sheets

SELF-LOCKING MECHANISM FOR A TELESCOPING COLUMN

BACKGROUND

The present invention relates to telescoping columns and, more particularly, to self-locking mechanisms for telescoping columns.

Telescoping columns typically include two or more tubes arranged in telescoping fashion. That is, one or more tubes are aligned along a common centerline, with each tube in the column being received within a preceding tube in the column. The column can be extended, where each tube is partially withdrawn from its preceding tube, and contracted, where each tube is fully or partially inserted within its preceding tube, as in a telescope.

Telescoping columns are used in a variety of applications. For example, telescoping columns are used in motor vehicles to absorb impact forces. One application of a telescoping column in a motor vehicle is in an extendible bumper system. Another application of a telescoping column in a motor vehicle is in a passenger restraint system.

Extendible bumper systems include one or more telescoping columns that support a front or rear bumper structure. The telescoping column is extended and retracted to move the bumper structure. Typically, these systems support the bumper structure close to the body of the motor vehicle during certain conditions, such as when the vehicle is being parked, and extend the bumper structure from the body during other conditions to increase the ability of the telescoping columns to convert the kinetic energy of a force on the bumper structure into work.

Passenger restraint systems may also include a telescoping column for extending and retracting a restraint structure. During certain conditions, these systems support the restraint structure in a position that allows freedom of passenger movement. In other conditions, these systems extend the restraint structure to restrain passenger movement and absorb the kinetic energy of a force on the restraint structure. One example of such a passenger restraint system is an extendible and retractable knee bolster system.

Where a telescoping column is to be used to absorb an impact force, the column may be fitted with a resistance medium between tubes in the column. The resistance medium provides little or no resistance to the movement of the movable structural elements relative to the fixed structural elements when the bumper is being extended or retracted by the actuator. In response to an impact force, however, the resistance medium "locks", providing an increased resistance to the relative movement of the tubes to convert the kinetic energy of the force into work. Accordingly, the resistance medium in a telescoping column is known as a self-locking mechanism.

SUMMARY OF THE INVENTION

In an exemplary embodiment, a telescoping column includes a first tube and a second tube arranged in telescoping fashion. A surface is disposed on the first tube, and a ramp, extending at an angle relative to the surface, is disposed on the second tube. A locking structure is disposed between the ramp and the surface. The locking structure contacts the ramp at a first elongated area of contact, and the locking structure contacts the surface at a second elongated area of contact. Relative movement of the first and second tubes in response to an impact force applied to one of the first and second tubes causes the locking structure to become wedged between the ramp and the surface, and at least a portion of the impact force is transmitted between the first and second tubes through the first and second elongated areas of contact. In one embodiment, the locking structure is cylindrical in shape. In another embodiment, the locking structure is a ring.

BRIEF DESCRIPTION OF THE DRAWINGS

Referring to the exemplary drawings wherein like elements are numbered alike in the several Figures.

DETAILED DESCRIPTION

Figure 1:
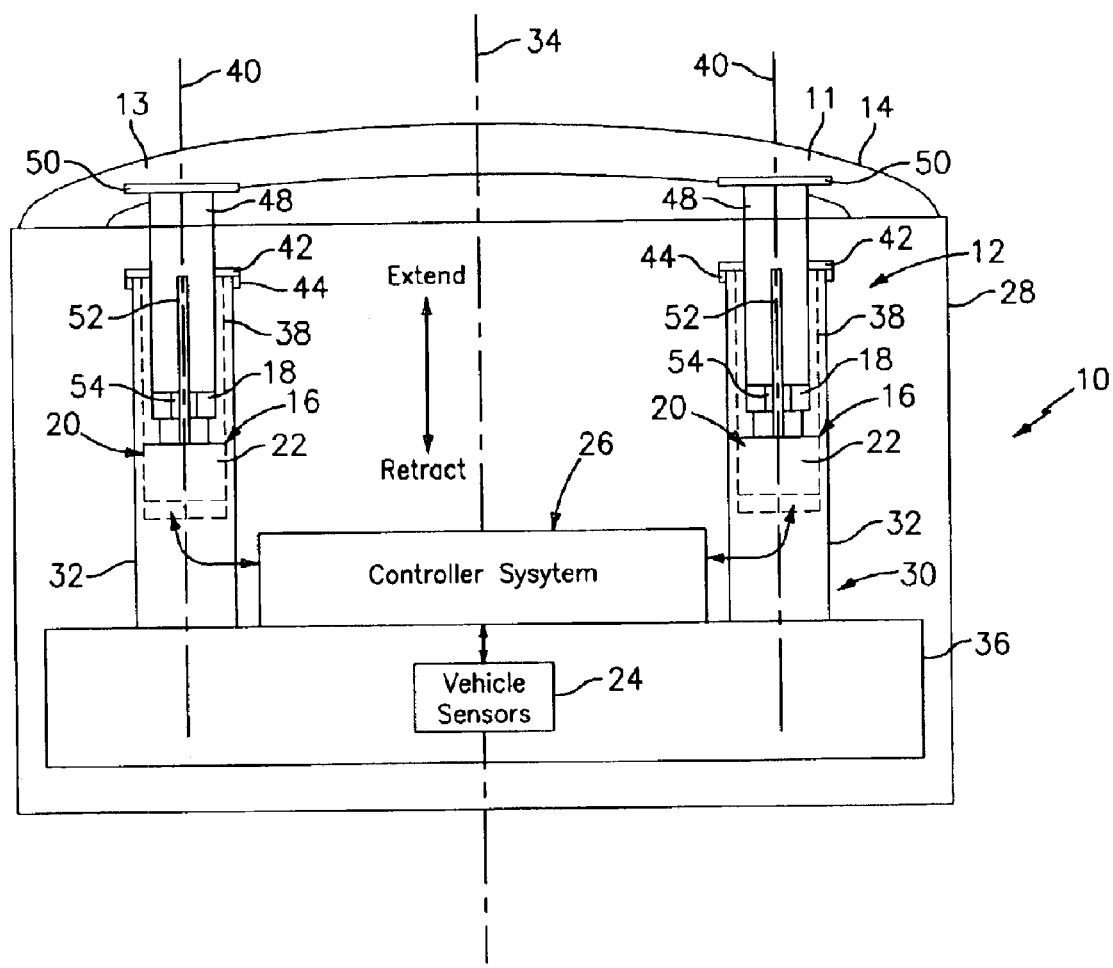
FIG. 1 is a schematic view of a pair of telescoping columns a retracted position.
Figure 2:
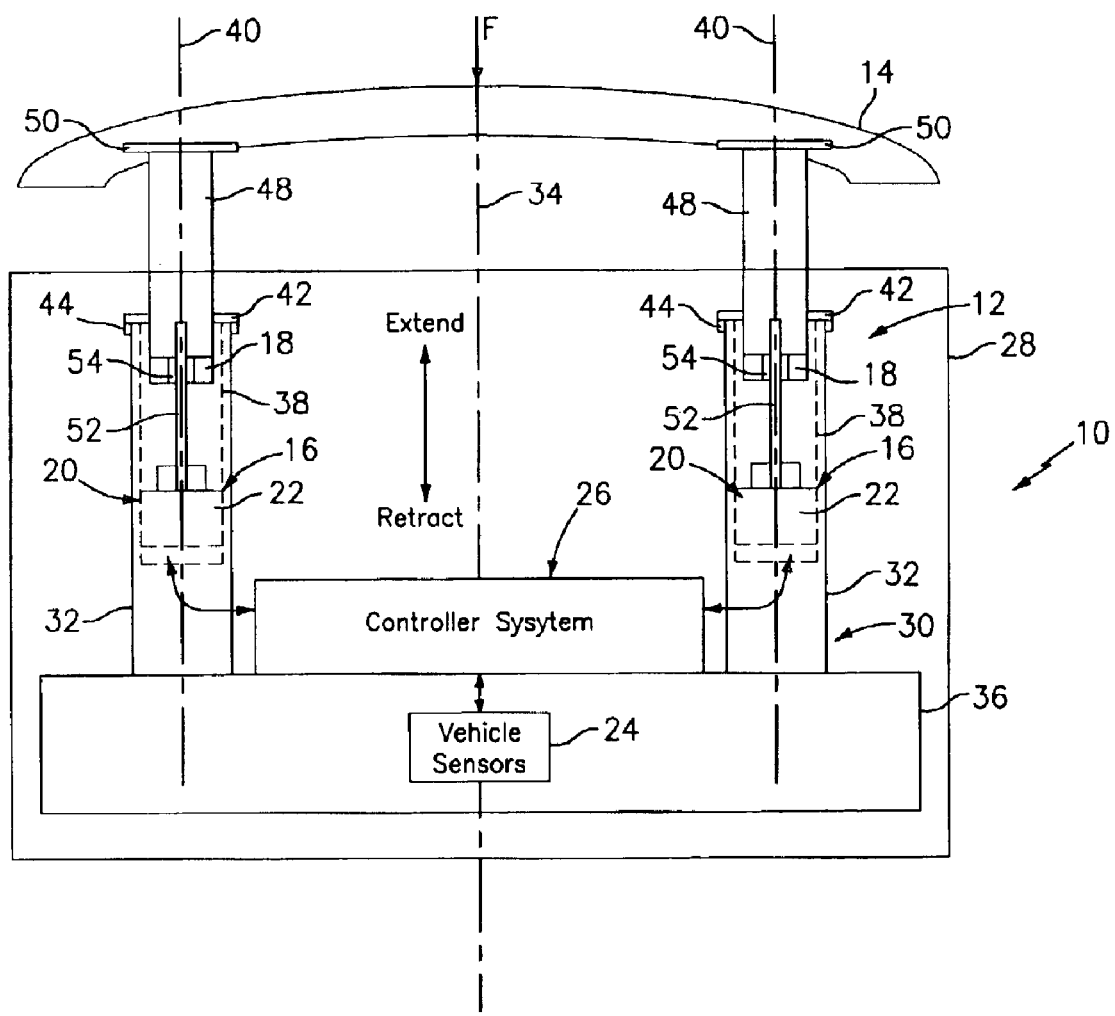
FIG. 2 is a schematic view of the pair of telescoping columns in an extended position.

Referring to FIGS. 1 and 2, a schematic view of a portion of a vehicle 10 including an extendible bumper system 12 is shown. Extendible bumper system 12 includes a bumper structure 14 supported at its ends 11 and 13 by telescoping columns 16, which move the bumper structure 14 between a retracted position, as shown in FIG. 1, and an extended position, as shown in FIG. 2. For purposes of example, telescoping columns 16 are described herein as being part of an extendible bumper system 12. It will be appreciated that telescoping columns 16 may be used in any application, either singularly on with multiple telescoping columns 16.

Each telescoping column 16 includes an outer tube 38 and an inner tube 48 aligned with a common longitudinal centerline 40, which is parallel to a longitudinal centerline 34 of the motor vehicle 10. Inner tube 48 is supported within the outer tube 38 for back and forth linear translation in the direction of the longitudinal centerline 40. Each telescoping column 16 also includes an actuator 20, which provides a force for extending and retracting the bumper structure 14, and a self-locking mechanism 18, which allows inner tube 48 to extend or retract freely within the outer tube 38 under the actuation force applied by the actuator 20, and provides a mechanical resistance between the inner tube 48 and the outer tube 38 in response to an impact force applied to the inner tube 48 via bumper structure 14 in the direction indicated at F in FIG. 2.

A controller system 26 in vehicle 10 controls the actuators 20 in response to signals provided by various sensors 24 in the vehicle 10. Sensors 24 obtain various parameters from vehicle 10 such as gear position (Park-Reverse-Neutral-Drive), vehicle speed, obstacle range, obstacle range approach rate, hard braking, anti-lock braking system activation, etc., which are used by bumper controller system 26 to determine the appropriate position of bumper structure 14. For example, during lower speed operation, the bumper structure 14 may be fully retracted for providing a short front end look to the vehicle 10 and for providing ease of parking due to short overall vehicle length. At higher vehicle 10 operating speeds, the bumper structure 14 may be fully extended, as shown in FIG. 2, to increase the ability of the telescoping columns 16 to convert the kinetic energy of the impact force F on the bumper structure 14 into work.

Vehicle 10 includes a body portion 28 attached to or integral with a frame portion 30. The frame portion 30 includes a pair of hollow frame rails 32 extending parallel to the longitudinal centerline 34 of the vehicle 10 and rigidly interconnected by a cross member 36. Disposed within each hollow frame rail 32 is a telescoping column 16. While each telescoping column 16 is described herein as being disposed within the hollow frame rail 32, other rigid attachments between the body portion 28 or frame portion 30 and the outer tube 38 may be substituted.

Coupled to an end of outer tube 38 is a flange 42, which extends radially outward from the outer tube 38 proximate an open end of frame rail 32. Flange 42 is secured to a flange 44 extending radially outward around a perimeter of the open end of frame rail 32 such that the outer tube 38 is rigidly coupled to the frame rail 32.

An end of the inner tube 48 is secured to a bumper interface flange 50, which is attached to the bumper structure 14 so that the inner tube 48 and the bumper structure 14 are supported on the vehicle 10 through the outer tube 38 and frame rail 32. The cross sectional shape of the inner tube 48 preferably matches the cross sectional shape of the outer tube 38. In the embodiment described herein, both the inner tube 48 and outer tube 38 are cylinders; however, the inner and outer tubes 48, 38 may have any convenient cross sectional shape.

Each actuator 20 is fixed relative to the outer tube 38, and provides an actuation force on the inner tube through the self-locking mechanism 18. This force is applied in either the extend or retract direction, depending on the desired motion of bumper structure travel. In the embodiment described herein, each actuator 20 includes a motor 22 rigidly secured to an end of the outer tube 38, and a threaded lead screw 52 coupled to the motor 22 and having its longitudinal centerline aligned with the longitudinal centerline 40 of the outer tube 38. Each linear actuator 20 also includes a nut 54 threadably engaged with the lead screw 52. The nut 54 is secured to the self-locking mechanism 18, which is, in turn, secured to the inner tube 48. Rotation of the lead screw 52 by the motor 22 causes translation of the nut 54 along the lead screw 52, which causes translation of the self-locking mechanism 18 and inner tube 48 between the retracted position shown in FIG. 1 and the extended position shown in FIG. 2.

While the actuators 20 are shown as employing motors 22, lead screws 52, and nuts 54, it is within the scope of this invention to employ any other actuators to impart the actuation force onto self-locking mechanism (18) in the extend and retract directions. Such actuators may include, for example, pneumatic or hydraulic actuators, or rack-and-pinion type actuators, such as described in U.S. Pat. No. 6,302,458, and the like.

The self-locking mechanism 18 allows inner tube 48 to extend or retract freely within the outer tube 38 under the actuation force applied by the actuator via lead screw 52, and provides a mechanical resistance between the inner tube 48 and the outer tube 38 in response to the impact force applied to the inner tube 48 in the direction indicated in FIG. 2. The mechanical resistance resists translation of the inner tube 48 relative to the outer tube 38, thereby directing at least a portion of the impact force from the inner tube 48 to the outer tube 38.

Figure 3:
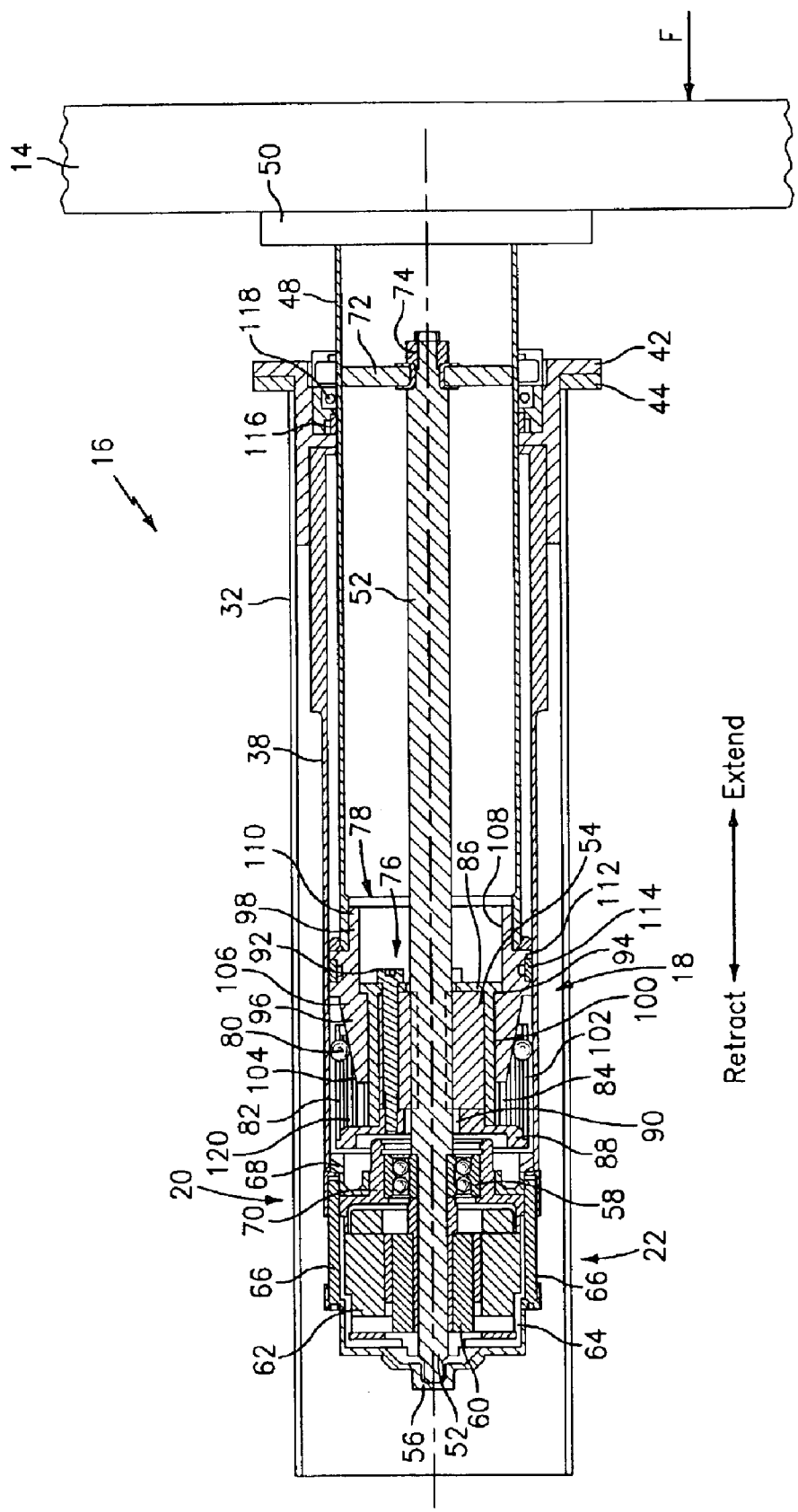
FIG. 3 is a cross-sectional view of a linearly actuated telescoping column.

FIG. 3 provides a detailed cross-sectional view of the telescoping column 16. In the embodiment shown, motor 22 includes: a hollow, cylindrical, rotor 60 through which a non-threaded end of lead screw 52 extends; a stator 62 disposed around the rotor 60; and ball bearings 58 through which the non threaded end of lead screw 52 extends. A housing 64 of motor 22 is secured to outer tube 38 by bolts 66, which extend through apertures disposed in the housing 64 and are received by threaded holes in a flange 68 secured to an end of outer tube 38. Flange 68 extends radially inward from the outer tube 38, and is shaped to provide support to a bearing end cap portion 70 of the housing 64.

Secured within the end cap portion 70 of housing 64 is the ball bearing 58 through which a portion of the lead screw 52 extends. The non-threaded end of the lead screw 52 ends in sleeve bearing 56, which is secured within the end cap portion of housing 64. Lead screw 52 is axially aligned with, and coupled to, the rotor 60 such that the rotor 60 and lead screw 52 rotate as one. An opposite end of lead screw 52 extends through the center of a disk shaped guide washer 72, and is secured to the guide washer 72 by a nut 74 threadably engaged with the end of the lead screw 52. Guide washer 72 maintains coaxial alignment between the lead screw 52 and the inner tube 48.

Threadably engaged to the lead screw 52 is nut 54, which is secured to the self-locking mechanism 18. Nut 54 is a cylindrical structure having threads formed on an inner surface to engage threads formed on the lead screw 52.

In the embodiment shown, self-locking mechanism 18 includes an actuator plate assembly 76 disposed within a shuttle 78. Shuttle 78 supports a plurality of locking structures 80, which are disposed in an evenly spaced relationship around an outer surface of the shuttle 78 by a slotted cylinder 82. In the embodiment of FIGS. 3–7, each locking structure 80 is a cylindrical structure (roller) having its longitudinal axis arranged perpendicular to the longitudinal centerline 40 of the center tube.

Actuator plate assembly 76 includes a cylindrical tube 84 disposed around the nut 54 and having a flange 86 that extends radially inward from the cylindrical tube and along one end of nut 54. Actuator plate assembly 76 also includes a circular actuator plate 88 extending along the opposite end of nut 54. Disposed through the center of actuator plate 88 is an aperture 90 through which lead screw 52 freely extends. One or more fasteners 92 extend through apertures formed in flange 86 and nut 54, and are threadably engaged to actuator plate 88 to secure the actuator plate assembly 76 to the nut 54. Flange 86 also extends radially outward from the cylindrical tube 84 for interacting with a land 94 formed on the shuttle 78.

Shuttle 78 is a tubular structure including a ramp portion 96 and a coupling and alignment portion 98 formed thereon. Ramp portion 96 has a cylindrical inside surface 100 and a cone-shaped outside surface 102, which forms a cone-shaped ramp that extends at an angle relative to the inside surface of the outer tube 38. The taper of the cone-shaped outside surface (ramp) 102 is selected such that the locking structures 80, which are maintained in contact the surface 102, provide little or no resistance to the relative motion of the inner and outer tubes 48 and 38 when the locking structures 80 are positioned proximate a circumferentially narrow end 104 of ramp portion 96, and such that the locking structures 80 provide a greater resistance to the relative motion of the inner and outer tubes 48 and 38 when the locking structures 80 are positioned proximate a circumferentially wide end 106 of ramp portion 96.

The coupling and alignment portion 98 of the shuttle 78 has a cylindrical inside surface 108 of greater diameter than the inside surface 100 of the ramp portion 96. The land 94 is created at the transition between the inside surfaces 108 and 100. A cylindrical outside surface 110 of the coupling and alignment portion 98 includes a boss 112 extending radially about its circumference and positioned proximate the circumferentially wide end 106 of the ramp portion 96. Outside surface 110 is received within inner tube 48, which is secured to boss 112 by fasteners, welding, or the like. Disposed in a slot formed around the circumference of boss 112 is a ring 114, which contacts the inside surface of outer tube 38 for axially aligning the shuttle 78 and inner tube 48 with the outer tube 38. Axial alignment between the inner and outer tubes 48 and 38 is further maintained by a ring 116 disposed in a slot formed in an inner surface the frame interface flange 42. Ring 116 contacts the outer surface of inner tube 48. Also installed in the frame interface flange 42 proximate ring 116 is a sealing ring 118, which wipes moisture and debris from the outer surface of inner tube 48 and prevents the moisture and debris from entering the outer tube 38.

Referring to FIGS. 3–7, locking structures 80 are evenly spaced around the circumference of the outer surface 102 of ramp portion 96. The even spacing of the locking structures 80 is maintained by the slotted cylinder 82, which is coupled to the perimeter of the actuator plate 88. Each locking structure 80 is disposed within its own slot 120 formed in the cylinder 82. Each locking structure 80 is captured between the outer surface 102 of ramp portion 96 and the inside surface of outer tube 38 by a preload assembly 150. While any suitable material may be used for locking structures 80, shuttle 78, and outer tube 38, it is preferred that the material used for locking structures 80 and shuttle 78 be harder than the material used for outer tube 38.

Preload assembly 150 includes a retainer ring 152, a resilient member 154, and a loading plate ring 156, each of which are disposed around ramp portion 96 proximate the circumferentially narrow end 104. Retainer ring 152 is disposed within a circumferential groove formed in ramp portion 96 proximate the circumferentially narrow end 104. Retainer ring 152 provides a shoulder for resilient member 154, which is sandwiched between retainer ring 152 and loading plate ring 156. Resilient member 154 may be a spring or a ring of resilient material such as rubber and the like. Loading plate ring 156 is biased by resilient member 154 towards locking structure 80. The force provided by resilient member 154 acts to push locking structure 80 up ramp portion 96 such that the locking structure 80 is kept in contact with the outer surface 102 of ramp portion 96 and the inside surface of outer tube 38.

Figure 4:
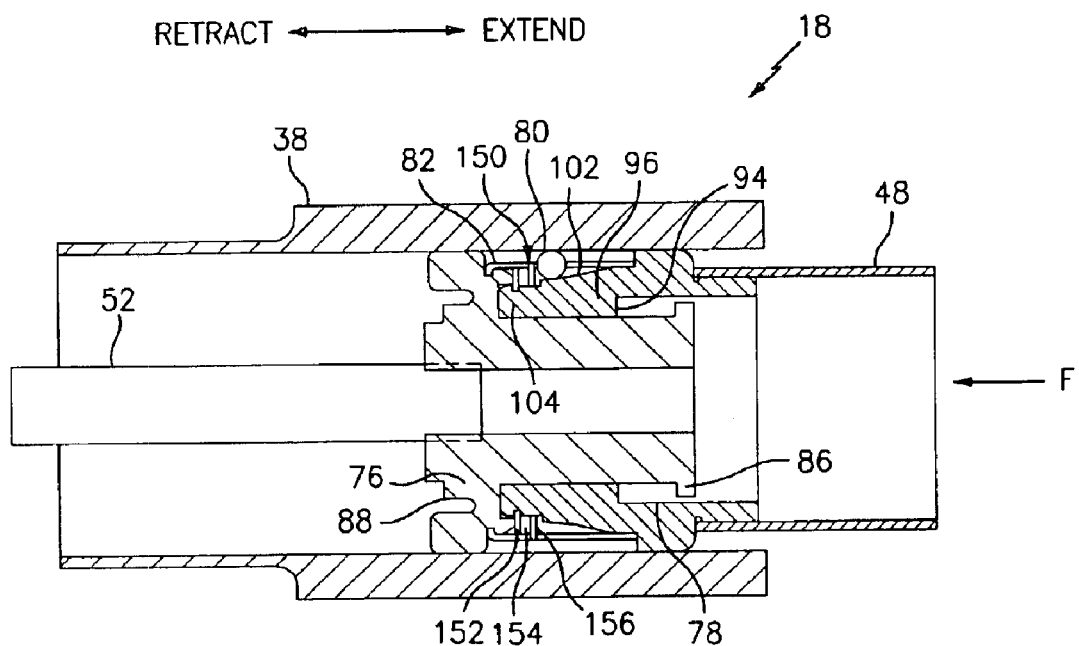
FIG. 4 is a cross-sectional view of a self-locking mechanism for the telescoping column during motion in the extend direction.
Figure 5:
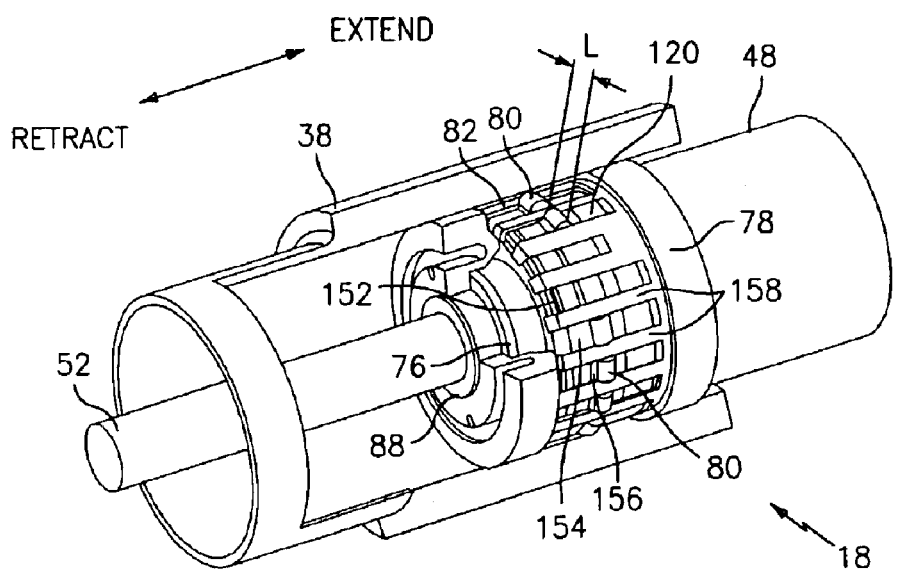
FIG. 5 is a perspective partially broken away view of the self-locking mechanism during motion in the extend direction.

Referring to FIGS. 4 and 5, slots 120 in slotted cylinder 82 form fingers 158 that extend between each locking structure 80. The ends of fingers 158 proximate actuator plate 88 are bent inwards and are received within a circumferential groove disposed in the actuator plate to secure the slotted cylinder 82 to the actuator plate 88.

In FIG. 3, inner tube 48 is shown in a fully retracted position. To move inner tube 48 to an extended position, motor 22 is operated such that rotor 60 and lead screw 52 rotate in a first direction (e.g., clockwise). Rotation of lead screw 52 drives nut 54 and actuator plate assembly 76 in the extend direction. Shuttle 78 remains stationary until actuator plate 88 contacts the circumferentially narrow end 104 of shuttle 78, as shown in FIGS. 4 and 5, at which point the force, F, applied by nut 54 through actuator plate 88 drives shuttle 78 and inner tube 48 in the extend direction. The bumper structure 14, which is secured to inner tube 48 via the bumper interface flange 50, is driven in the extend direction by the inner tube 48. Motion of the shuttle 78 in the extend direction forces locking structures 80 toward the circumferentially narrow end 104 of shuttle 78, allowing the inner tube 48 to move relative to the outer tube 38. The inner tube 48 is driven in the extend direction until it reaches its fully extended position, at which point the rotation of the rotor 60 and lead screw 52 is stopped.

With the self-locking mechanism 18 in the extended position, an impact force F on the inner tube 48 via bumper structure 14 will be translated through inner tube 48 to shuttle 78, moving the shuttle 78 in the retract direction with respect to the outer tube 38. Motion of the shuttle 78 in the retract direction under the impact force F causes locking structures 80 to ride up the cone-shaped outer surface (ramp) 102 where they are wedged between the cone-shaped outer surface 102 and the inner surface of the outer tube 38, shunting at least a portion of the impact force F from inner tube 48 to outer tube 38 and, in turn, to the frame portion 30 of the vehicle 10 (FIG. 1).

The force applied by the locking structures 80 onto the inner surface of the outer tube 38 in response to the impact force F may cause deformation of the outer tube 38 at the region of contact. Similarly, the force applied by the ramp portion 96 onto the locking structures 80 in response to the impact force F may cause deformation of the ramp portion 96 at the region of contact. Depending on the magnitude of this force, the deformation of these structures may be elastic, for a relatively low magnitude force, or plastic, for a relatively high magnitude force. Whereas elastic deformation will result in no permanent deformation after the force is removed, plastic deformation of these structures results in their permanent deformation.

In the self-locking mechanism 18, each locking structure 80 provides an elongated area of contact between the locking structure 80 and the cone-shaped outer surface (ramp) 102, and an elongated area of contact between the locking structures 80 and the inner surface of the outer tube 38. In the embodiment of FIGS. 3–7, the locking structures 80 are cylindrical in shape to provide the elongated areas of contact, each of which extends along the entire length "L" of the cylindrical locking structure 80. The force between the cone-shaped outer surface 102 and each locking structure 80 is distributed along this elongated area of contact. Similarly, the force between each locking structure 80 and the inner surface of the outer tube 38 is distributed along this elongated area of contact. By elongating the contact area, and thus increasing the area over which this force is distributed, the threshold of plastic deformation is increased.

Figure 6:
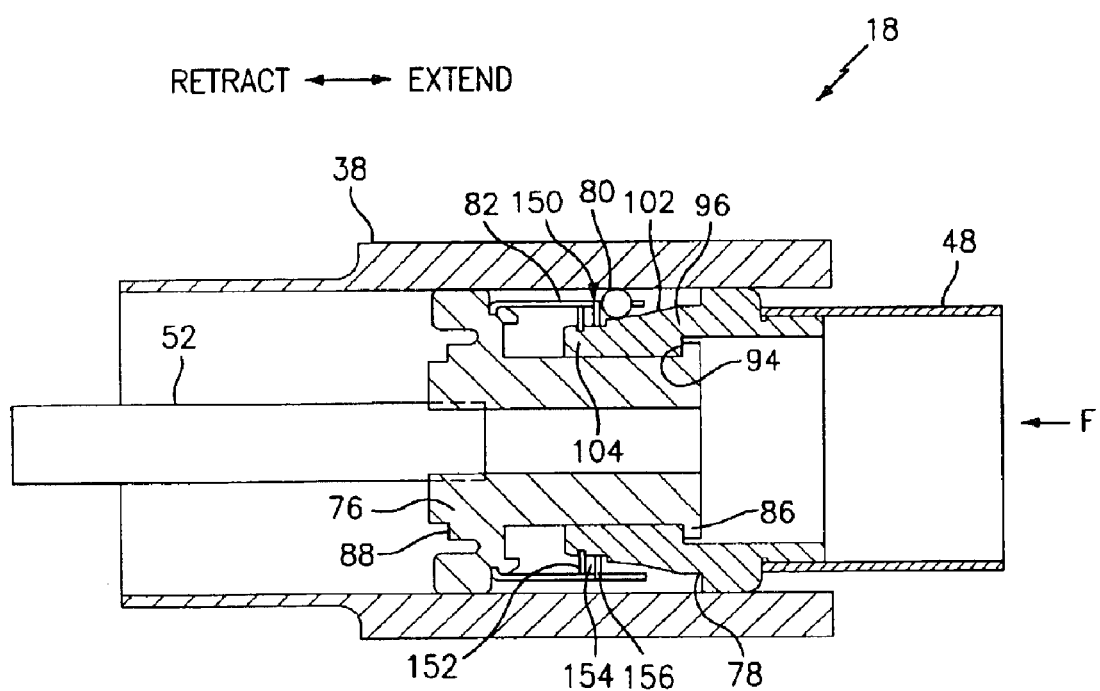
FIG. 6 is a cross-sectional view of the self-locking mechanism during motion in the retract direction.
Figure 7:
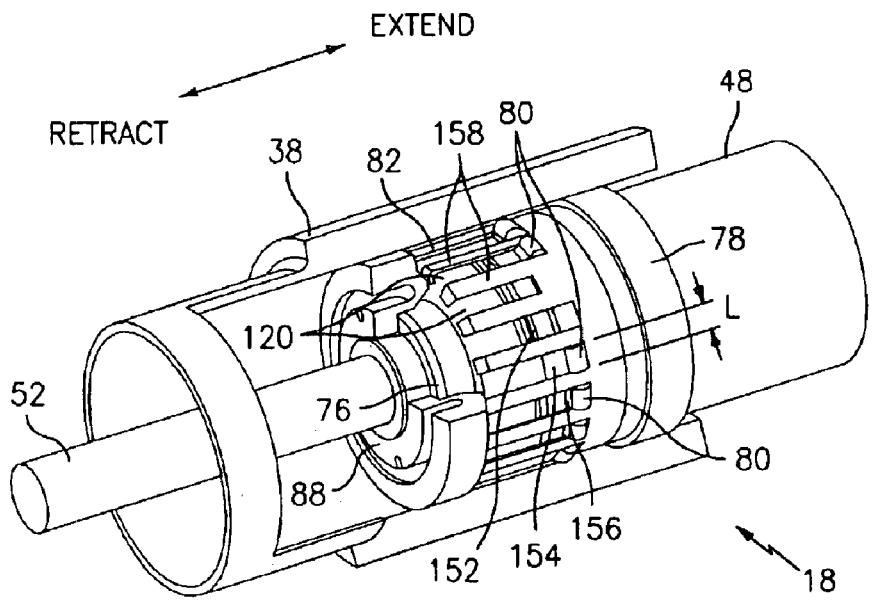
FIG. 7 is a perspective partially broken away view of the self-locking mechanism during motion in the retract direction.

To move inner tube 48 to a retracted position, motor 22 is operated such that rotor 60 and lead screw 52 rotate in the second direction (e.g., counter clockwise). Rotation of lead screw 52 drives nut 54 and actuator plate assembly 76 in the retract direction. Nut 54, actuator plate assembly 76, and slotted cylinder 82 move relative to ramp portion 96. As the slotted cylinder 82 moves in the retract direction, the locking structures 80 are drawn towards the circumferentially narrow end 104 of shuttle 78 by ends of the slots 120, where the locking structures 80 will provide little or no resistance to the relative motion of inner and outer tubes 48 and 38. Shuttle 78 remains stationary until the flange 86 on the actuator plate assembly 76 contacts land 94 on shuttle 78, as shown in FIGS. 6 and 7, at which point the force applied by nut 54 through flange 86 drives shuttle 78 and inner tube 48 in the retract direction. The inner tube 48 is driven in the retract direction until it reaches its fully retracted position, as shown in FIG. 3, at which point the rotation of the rotor 60 and lead screw 52 is stopped.

Referring to FIGS. 8–11, an alternative embodiment of self-locking mechanism 18 is shown wherein locking structure 80 is a ring disposed around shuttle 76. The ring may be solid, extending around the shuttle 76, or a may comprise a plurality of ring segments, with each ring segment extending around a portion of the shuttle 76. As in the previously described embodiment, locking structure 80 provides an elongated area of contact between the locking structure 80 and the outer tube 38 and shuttle 78. In this embodiment, the elongated area of contact extends along the outer and inner surfaces 160 and 162 of the locking structure 80, and along the width W of the locking structure 80.

In the embodiment of FIGS. 8–11, the slotted cylinder 82 of FIGS. 3–7 has been replaced by a plurality of T-shaped fingers 164, which are evenly spaced around, and secured to, the perimeter of actuator plate 88. Each T-shaped finger 164 extends through an associated slot disposed in the outer surface 160 of the locking structure 80. Also in the embodiment of FIGS. 8–11, resilient member 154 and loading plate ring 156 have been removed, and retainer ring alone retains locking structure 80 between the outer surface 102 of ramp portion 96 and the inside surface of outer tube 38. It will be appreciated, however, that resilient member 154 and loading plate ring 156 may be employed in the embodiment of FIGS. 8–11.

Figure 8:
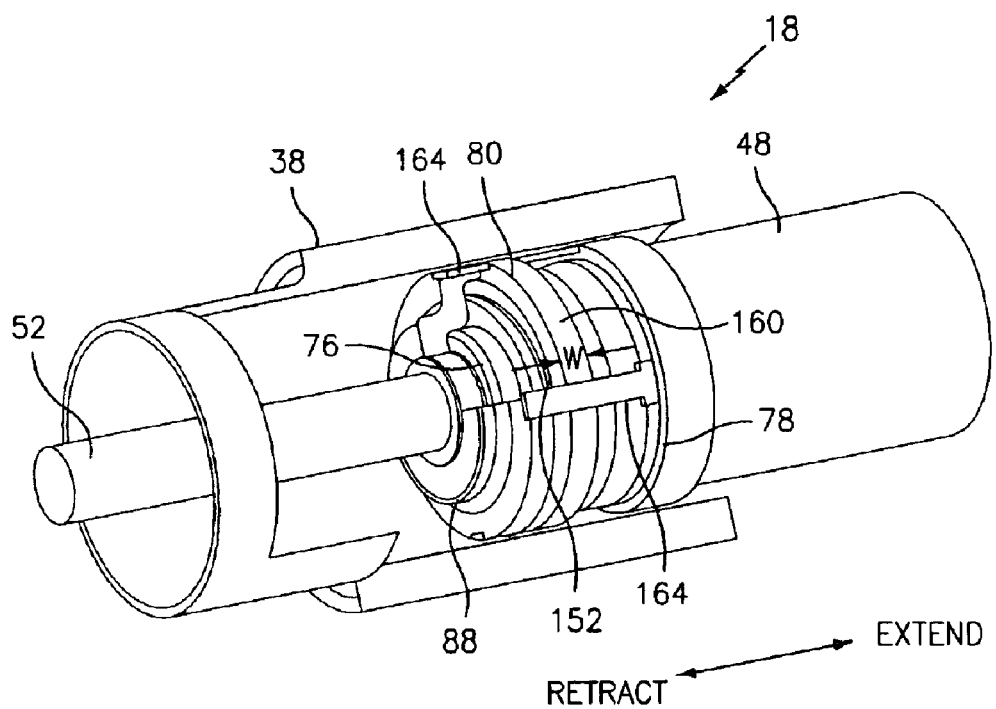
FIG. 8 is a perspective partially broken away view of an alternative embodiment of the self-locking mechanism for the telescoping column during motion in the extend direction.
Figure 9:
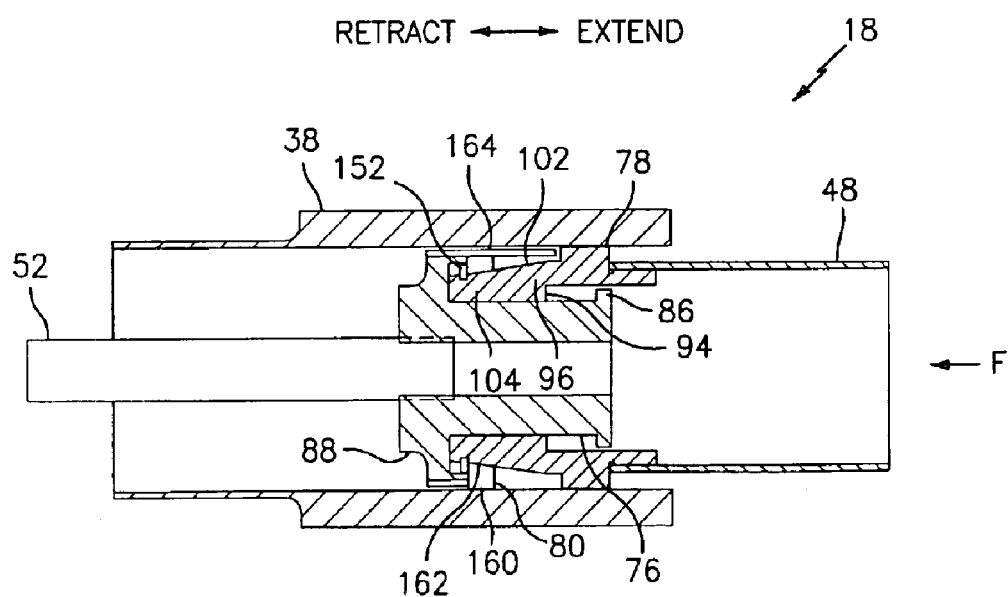
FIG. 9 is a cross-sectional view of the alternative embodiment of the self-locking mechanism during motion in the extend direction.

In FIGS. 8 and 9 self-locking mechanism 18 is shown in the extended position corresponding to FIGS. 4 and 5 described above. With the self-locking mechanism 18 in the extended position, an impact force F on the inner tube 48 via bumper structure 14 will be translated through inner tube 48 to shuttle 78, moving the shuttle 78 in the retract direction with respect to the outer tube 38. Motion of the shuttle 78 in the retract direction under the impact force F causes locking structure 80 to ride up the cone-shaped outer surface 102 where it is wedged between the cone-shaped outer surface 102 and the inner surface of the outer tube 38, shunting at least a portion of the impact force F from inner tube 48 to outer tube 38 and, in turn, to the frame portion 30 of the vehicle 10 (FIG. 1).

A first elongated area of contact is provided between the inner surface 162 of the locking structure 80 and the cone-shaped outer surface 102, and a second elongated area of contact is provided between the outer surface 160 of the locking structure 80 and the inner surface of the outer tube 38. The force between the cone-shaped outer surface 102 and locking structure 80 is distributed along the first elongated area of contact. Similarly, the force between locking structure 80 and the inner surface of the outer tube 38 is distributed along the second elongated area of contact. By elongating the contact area, and thus increasing the area over which force is distributed, the threshold of plastic deformation is increased.

Figure 10:
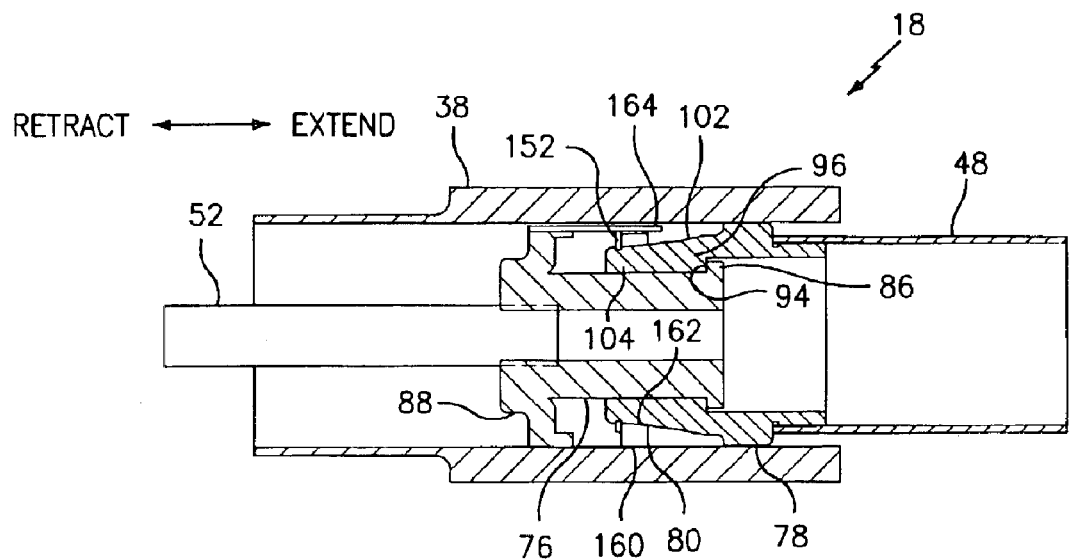
FIG. 10 is a cross-sectional view of the alternative embodiment of the self-locking mechanism during motion in the retract direction.
Figure 11:
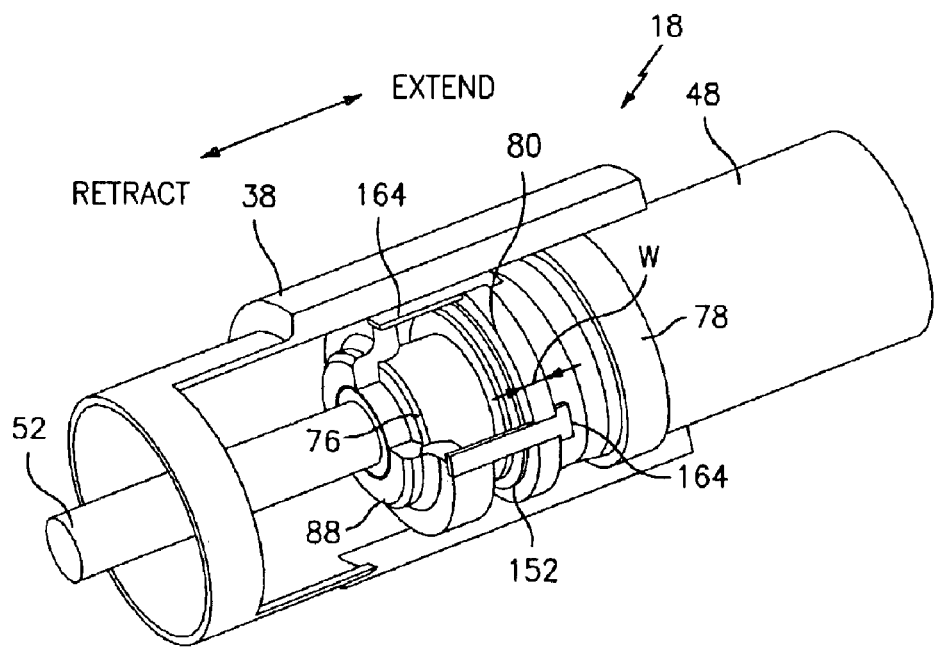
FIG. 11 is a perspective partially broken away view of the alternative embodiment of the self-locking mechanism during motion in the retract direction.

Referring to FIGS. 3, 8 and 9, to move inner tube 48 to a retracted position, motor 22 is operated such that rotor 60 and lead screw 52 rotate in the second direction (e.g., counter clockwise). Rotation of lead screw 52 drives nut 54 and actuator plate assembly 76 in the retract direction. Nut 54, actuator plate assembly 76, and T-shaped fingers 164 move relative to ramp portion 96. As the T-shaped fingers 164 move in the retract direction, the locking structure 80 is drawn towards the circumferentially narrow end 104 of shuttle 78 by the ends of T-shaped fingers 164, where the locking structure 80 will provide little or no resistance to the relative motion of inner and outer tubes 48 and 38. Shuttle 78 remains stationary until the flange 86 on the actuator plate assembly 76 contacts land 94 on shuttle 78, as shown in FIGS. 10 and 11, at which point the force applied by nut 54 through flange 86 drives shuttle 78 and inner tube 48 in the retract direction. The inner tube 48 is driven in the retract direction until it reaches its fully retracted position, as shown in FIG. 3, at which point the rotation of the rotor 60 and lead screw 52 is stopped.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A telescoping column comprising:
    a first tube and a second tube arranged in telescoping fashion;
    a surface disposed on the first tube;
    a ramp disposed on the second tube and extending at an angle relative to the surface;
    a locking structure disposed between the ramp and the surface, the locking structure contacting the ramp at a first elongated area of contact, and the locking structure contacting the surface at a second elongated area of contact, the locking structure comprising a multi-segment ring-shaped locking structure; and
    a plurality of fingers extending between the segments of the ring-shaped locking structure;
    wherein relative movement of the first and second tubes in response to an impact force applied to one of the first and second tubes causes the fingers to move relative to the ramp, and causes the locking structure to become wedged between the ramp and the surface for transmitting at least a portion of the impact force between the first and second tubes through the first and second elongated areas of contact.

2. The telescoping column of claim 1, wherein the locking structure is cylindrical in shape.

3. The telescoping column of claim 2, wherein the ramp is a cone-shaped ramp having a common longitudinal centerline with the first tube and the second tube.

4. The telescoping column of claim 3, further comprising:
    a cylinder disposed around the cone-shaped ramp, the cylinder including a slot disposed therein, the locking structure being disposed within the slot, wherein application of an actuation force to retract the second tube within the first tube moves the cylinder relative to the cone-shaped ramp to draw the locking structure proximate a circumferentially narrow end of the cone-shaped ramp.

5. The telescoping column of claim 1, wherein the ramp is a cone-shaped ramp having a common longitudinal centerline with the first tube and the second tube, and the locking structure is a ring disposed around the cone-shaped ramp.

6. The telescoping column of claim 5, wherein the ring comprises a plurality of segments.

7. The telescoping column of claim 6, further comprising:
   a plurality of fingers extending through slots disposed in the perimeter of the ring, wherein application of an actuation force to retract the second tube within the first tube moves the fingers relative to the cone-shaped ramp to draw the ring proximate a circumferentially narrow end of the cone-shaped ramp.

8. A telescoping column comprising:
   an outer tube having an inside cylindrical surface formed thereon;
   an inner tube supported in the outer tube for linear translation relative to the outer tube between an extended and a retracted position;
   an actuator coupled to the inner tube, the actuator providing an actuation force for translating the inner tube between the extended position and the retracted position;
   a cone-shaped ramp disposed on the inner tube;
   a locking structure disposed between the cone-shaped ramp and the inside cylindrical surface, the locking structure contacting the cone-shaped ramp at a first elongated area of contact, and the locking structure contacting the inside cylindrical surface at a second elongated area of contact, the locking structure comprising a multi-segment ring-shaped locking structure; and
   a plurality of fingers extending between the segments of the ring-shaped locking structure;
   wherein the locking structure is positioned proximate a circumferentially narrow end of the cone shape ramp during translation of the inner tube between the extended position and the retracted position wider the force of the actuator, and the locking structure becomes wedged between the cone-shaped ramp and the inside cylindrical surface in response to an impact force applied to the inner tube and the fingers moving relative to the ramp, the locking structure transmitting at least a portion of the impact force from the inner tube to the outer tube through the first and second elongated areas of contact.

9. The telescoping column of claim 8, wherein the locking structure is cylindrical in shape.

10. The telescoping column of claim 9, further comprising:

a cylinder disposed around the cone-shaped ramp, the cylinder including a slot disposed therein, the locking structure being disposed within the slot wherein the force of the actuator to translate the inner tube to the retracted position moves the cylinder relative to the cone-shaped ramp to draw the locking structure proximate the circumferentially narrow end of the cone-shaped ramp.

11. The telescoping column of claim 8, wherein the locking structure is a ring disposed around the cone-shaped ramp.

12. The telescoping column of claim 11, wherein the ring comprises a plurality of segments.

13. The telescoping column of claim 12, further comprising:
   a plurality of fingers extending through slots disposed in the perimeter of the ring, force of the actuator to translate the inner tube to the retracted position moves the fingers relative to the cone-shaped ramp to draw the ring proximate the circumferentially narrow end of the cone-shaped ramp.

14. A telescoping column comprising:
   a first tube and a second tube arranged in telescoping fashion;
   a surface disposed on the first tube;
   a ramp disposed on the second tube and extending at an angle relative to the surface;
   a locking structure disposed between the ramp and the surface, the locking structure contacting the ramp at a first elongated area of contact, and the locking structure contacting the surface at a second elongated area of contact, wherein the locking structure comprises a ring disposed around the ramp, the ring comprising a plurality of slots, and the locking structure further comprising a plurality of fingers extending through the slots, wherein application of an actuation force to retract the second tube within the first tube moves the finger relative to the ramp to draw the ring proximate a circumferentially narrow end of the ramp; and
   wherein relative movement of the first and second tubes in response to an impact force applied to one of the first and second tubes causes the locking structure to become wedged between the ramp and the surface for transmitting at least a portion of the impact force between the first and second tubes through the first and second elongated areas of contact.

15. The telescoping column of claim 8, wherein the locking structure comprises a ring disposed around the cone-shaped limp, the ring comprising a plurality of slots, and the locking structure further comprising:
   a plurality of fingers extending through the slots, wherein the force of the actuator to translate the inner tube to the retracted position moves the fingers relative to the cone-shaped ramp to draw the ring proximate a circumferentially narrow end of the cone-shaped ramp.

* * * * *